United States Patent [19]

Chen

[11] Patent Number: 4,594,886

[45] Date of Patent: Jun. 17, 1986

[54] MULTIPURPOSE TIMING LIGHT

[76] Inventor: Duke Chen, 9th Fl., No. 75, Nanking E. Road, Sec. 4, Taipei, Taiwan

[21] Appl. No.: 707,555

[22] Filed: Mar. 4, 1985

[51] Int. Cl.⁴ .......................................... G01M 15/00
[52] U.S. Cl. ...................................... 73/116; 324/392
[58] Field of Search ................. 324/391, 392; 73/116; 362/253, 157, 119, 120

[56] References Cited

U.S. PATENT DOCUMENTS 3,573,609 4/1971 Vaher .................................. 324/391
4,230,969 10/1980 Nieuwenhuis et al. ......... 324/391 X

FOREIGN PATENT DOCUMENTS 2110359 6/1983 United Kingdom ................ 362/253

Primary Examiner—Jerry W. Myracle
Attorney, Agent, or Firm—Sheridan Neimark; A. Fred Starobin

[57] ABSTRACT

A multipurpose timing light which comprises a timing light, a tachometer and a flashlight housed in a gun shaped plastic shell which in appearance is similar to the prevailing timing gun and in addition has a flashlight underneath the gun barrel and a tachometer in the rear part of the gun. This device provides illumination for the timing operation and repair work, and indicates engine speed as well as its primary function of adjusting ignition timing.

1 Claim, 5 Drawing Figures

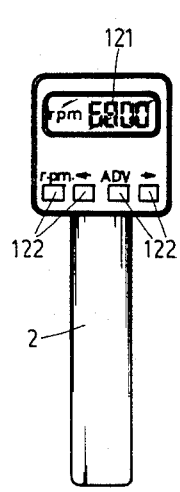 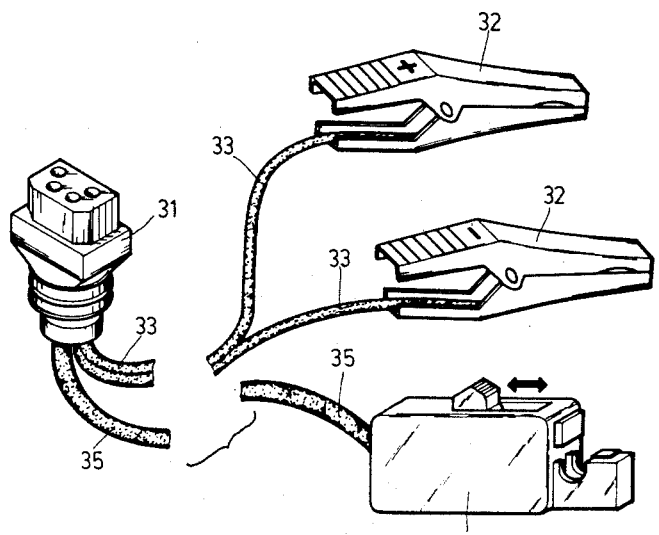
FIG.3    FIG.4
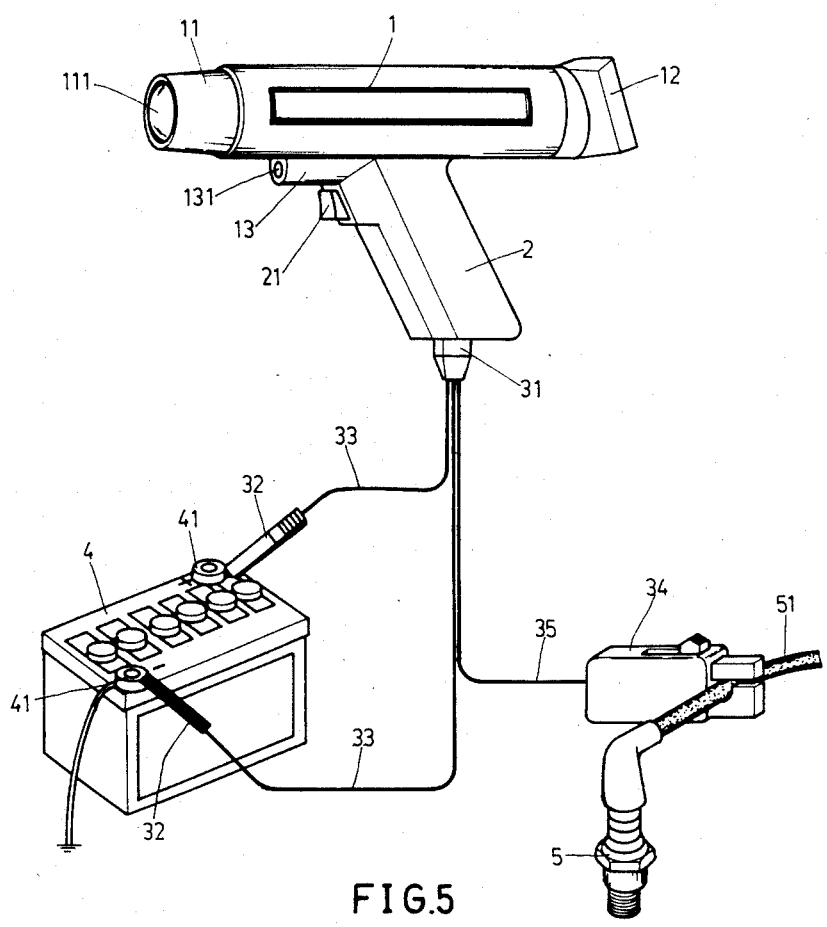
FIG.5

MULTIPURPOSE TIMING LIGHT

BACKGROUND OF THE INVENTION

An exact ignition timing is important to the performance of the engine. A spark plug in the cylinder usually emits spark several degrees before the piston reaches the upmost position (or Top Dead Center). This job is done by the coordination of distributor axle and camshaft. However once the cam surface or the braker point is worn out the ignition timing becomes inaccurate. Under this circumstance, the explosion in the cylinders will be either too early or too late which results in poor engine performance. The ignition timing of a gasoline engine thus needs regular adjustment to assure its exact timing.

Timing is usually done by a timing gun which emits lights to timing marks (71) commonly found on the vibration damper (7) of crank shaft (6). The power of timing light is induced from the current to spark plug by introducing a induction clamp on the distribution wire to the plug. The induced current is amplified to actuate the xenon bulb to emit flashing light simultaneously with the firing of a spark plug. The emitted light shall be aiming at the marks on the damper. Because the emitting of the timing light is synchronized with the engine explosion, we will be able to see the timing marks in a motionless-like situation. The ignition timing is then indicated by the relative position between the marks and a pointer (81) on the timing gear cover (8).

Ignition timing, however, is a variant of engine speed. When engine is working at a higher speed, it has very short combustion time. To make sure of a more complete combustion, the ignition timing has to be advanced a little bit earlier. Otherwise the piston will reach upmost position and start to be pushed downward before the fuel is completely ignited. For this reason, the timing work has to be done under certain engine speed (RPM) according to the specification of the automobile manufacturer. The instrument for testing engine speed is a so called "Tachometer".

SUMMARY OF THE INVENTION

Another problem often encountered in adjusting ignition timing is insufficient illumination. Under such condition, the adjustment of the distributor is extremely difficult without the help of an illuminant.

Summing up all the shortcomings in adjusting ignition timing, there is needed a timing gun for synchronizing with timing marks, a tachometer for checking the engine speed and an illuminant for providing illumination. Usually, these are three separate devices which makes the timing work troublesome and time-consuming. In view of these shortcomings, the inventor has developed this "Multipurpose Timing Light". The invention is a timing light in which a flashlight and a tachometer are attached for the convenience of the timing operation.

So a primary object of this invention is to provide a timing light equipped with a tachometer and a flashlight so that the timing work can be conveniently executed with this single device.

A further object of this invention is to provide a device in which its components can be used independently as a timing light, a tachometer or a flashlight in automobile maintainance work. The invention will be further explained with the illustration of the drawings.

BRIEF DESCRIPTION OF THE DRAWINGS

FIG. 3 is a rear view of the present invention showing the displaying screen of the tachometer.

FIG. 4 shows the perspective view of the wiring with the connectors.

FIG. 5 shows the set-up of the invention with battery and distribution wire.

DETAILED DESCRIPTION OF A PREFERRED EMBODIMENT

Figure 1:
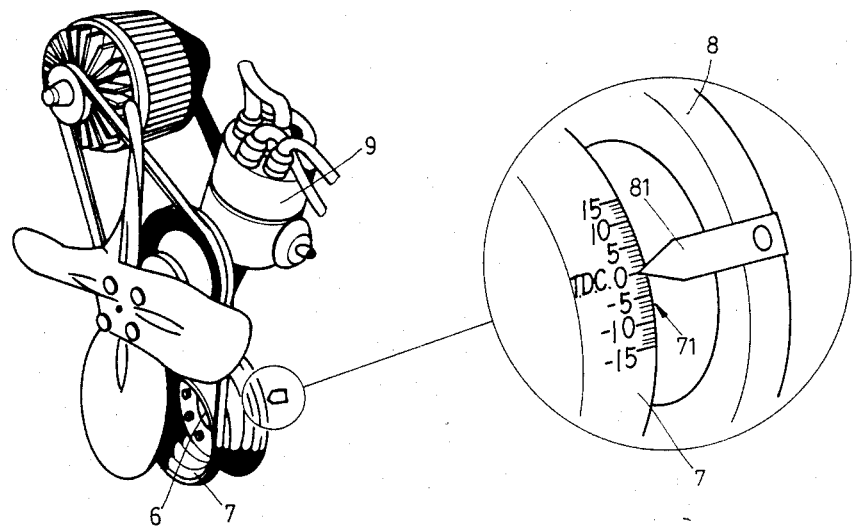
FIG. 1 shows the location of the timing mechanism on the vibration damper with a magnification showing the details of the marks and the pointer.
Figure 2:
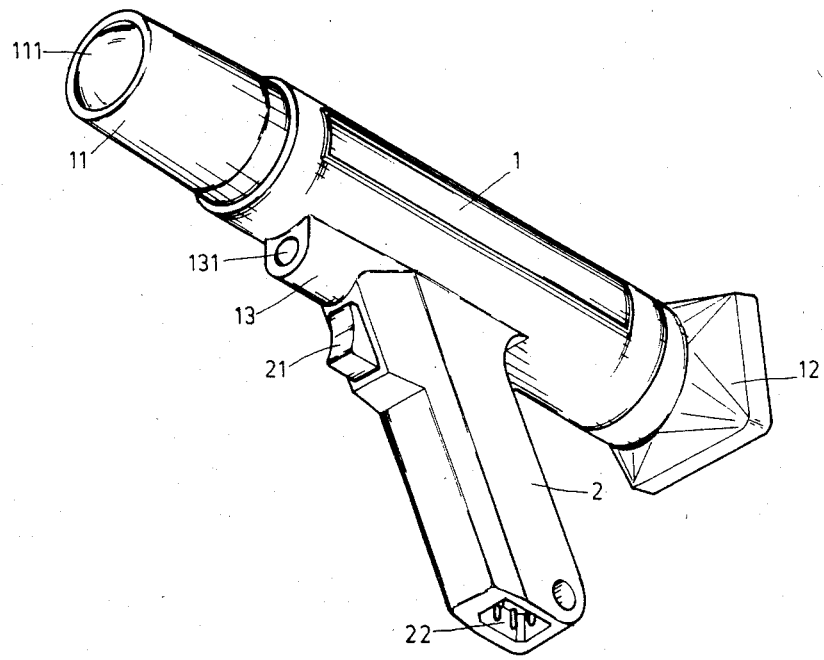
FIG. 2 is a perspective view of a multipurpose timing light according to this invention.

Referring to FIG. 2, for the convenience of using by a single hand the invention is designed as a gun shaped structure. Electric circuit is housed in the gun body(1) and in the handle(2). The trigger(21) works as a switch. The muzzle(11) has a convex lens(111) in the bore for concentrating the emitting light. Underneath the gun body is a flashlight compartment(13) with a light bulb(131) in its opening. Tachometer(12) is in the rear part of the body with a displaying panel. A receptacle(22) is in the bottom of handle(2).

Referring to FIG. 3, the displaying panel has a LCD displaying screen(121) and several adjusting buttons(122).

Referring to FIG. 4, power for operating this device comes from two sources: battery and induction. From connector(31) two cables(33) are extended to two battery clamps(32) and a induction cable(35) to a induction clamp(34).

Referring to FIG. 5, when preparing for operation, the connector(31) shall be plugged into the receptacle(22) underneath the handle(2). Battery clamps (32) are connected to the assigned electrodes(41) of a battery(4). The battery supplies the power needed in timing gun such as flashlight, etc. The flashlight shall provide necessary illumination for the operation. The induction clamp(34) is to be clamped around the distribution wire(51) to the spark plug(5) of a first cylinder. The induction clamp(34) shall produce an induced pulse from the electricity of distribution wire(51). The pulse is then amplified and actuates the xenon bulb to emit light through a convex lens(111). The emitted light is synchronized with the engine ignition so that when the light is aiming at the marks on the vibration damper(7) the marks will appear motionless. At the same time, the engine idle speed is detected from the display of the tachometer. If the engine idle speed is not within the specification, it can be adjusted by turning the idle adjusting screw by the carburetor. After idle speed is adjusted within the specification, recheck the marks on the vibration damper and the indicating pointer. When the indicating pointer is pointing to the specified mark the ignition timing is right. Otherwise, it has to be adjusted by loosening the screw of the distributor and rotating the distributor until the pointer and the specified mark are lined. This invention makes the timing adjustment a one-step operation rather than multiple steps by using separate devices. Besides, the flashlight itself can be used independently as illuminant for other repairing or maintanance work. Summing up the present invention, it is an ignition timing light, tachometer and flashlight, in other words, a three-in-one instrument which is designed as a gun shaped structure. It can be used by a single hand to achieve the ignition timing work with ease and accuracy.

I claim:

1. A multipurpose ignition timing light comprising a main body-gun shaped structure having a bored barrel and an attached handle extending from said barrel;

a timing light means including a xenon light in the bore of said barrel and a convex lens at an end of said barrel, aligned with said neon light;

a tachometer means on said body structure having a display panel on the opposite end of said barrel from said convex lens to indicate engine speed;

a lighting means mounted beneath said barrel emitting a beam of light aligned substantially parallel with a beam of flashing light emitted from said neon light through said convex lens at said end of said barrel;

switching means including a trigger mounted on said attached handle; and connecting means on said handle to receive connections from an electric source and a source of induced current.

* * * * *